(12) United States Patent
Marty et al.

(10) Patent No.: US 11,002,754 B2
(45) Date of Patent: May 11, 2021

(54) PITOT PROBE WITH MANDREL AND PRESSURE SWAGED OUTER SHELL

(71) Applicant: Rosemount Aerospace Inc., Burnsville, MN (US)

(72) Inventors: Eric Marty, Savage, MN (US); Kenneth L. Freiborg, Bloomington, MN (US); Marc Wollak, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/182,357

(22) Filed: Nov. 6, 2018

(65) Prior Publication Data
US 2020/0141964 A1    May 7, 2020

(51) Int. Cl.
*G01P 5/165*    (2006.01)

(52) U.S. Cl.
CPC .................................... *G01P 5/165* (2013.01)

(58) Field of Classification Search
None
See application file for complete search history.

(56) References Cited

U.S. PATENT DOCUMENTS

| | | | |
|---|---|---|---|
| 2,254,155 A | 8/1941 | Reichel | |
| 2,343,282 A | 3/1944 | Daiber | |
| 2,381,327 A | 8/1945 | Woodman et al. | |
| 2,393,593 A | 1/1946 | Daiber | |
| 2,399,370 A | 4/1946 | McOrlly | |
| 2,428,542 A | 10/1947 | Bernhardt | |
| 2,601,331 A | 6/1952 | Segal | |
| 2,640,347 A | 6/1953 | Majeski | |
| 2,984,107 A | 5/1961 | Strieby et al. | |
| 2,987,565 A | 6/1961 | Barnhart et al. | |
| 3,267,992 A | 8/1966 | Werner et al. | |
| 3,400,583 A * | 9/1968 | Newport | G01P 5/165 73/182 |
| 3,535,930 A * | 10/1970 | Rees | H05B 3/00 73/861.68 |
| 3,590,460 A * | 7/1971 | Highducheck | B21D 39/04 29/761 |
| 3,885,613 A * | 5/1975 | Evans | F16B 39/30 411/311 |
| 4,152,938 A | 5/1979 | Danninger | |

(Continued)

FOREIGN PATENT DOCUMENTS

| CN | 2420633 Y | 2/2001 |
|---|---|---|
| CN | 102735888 A | 10/2012 |

(Continued)

OTHER PUBLICATIONS

Bifilar Coil, Wikipedia, as captured by the Internet Archive on Aug. 2, 2015, 3 pages.

(Continued)

*Primary Examiner* — Harshad R Patel
(74) *Attorney, Agent, or Firm* — Kinney & Lange, P.A.

(57) ABSTRACT

A probe head of a pitot probe includes a mandrel having a helical groove, a heater within the helical groove of the mandrel such that an exterior surface of the heater is flush with an exterior surface of the mandrel, and an outer shell having an interior surface in air-tight contact with the mandrel and the heater.

14 Claims, 10 Drawing Sheets

(56) References Cited

U.S. PATENT DOCUMENTS

| | | | |
|---|---|---|---|
| 4,312,120 A * | 1/1982 | Comer | F23Q 7/001 219/267 |
| 4,615,213 A | 10/1986 | Hagan | |
| 4,836,019 A * | 6/1989 | Hagen | G01P 5/165 73/180 |
| 5,025,661 A | 6/1991 | McCormack | |
| 5,046,360 A | 9/1991 | Hedberg | |
| 5,062,869 A | 11/1991 | Hagen | |
| 5,099,686 A | 3/1992 | Koehler | |
| 5,130,707 A | 7/1992 | Hagen | |
| 5,220,319 A | 6/1993 | Kendel | |
| 5,228,563 A | 7/1993 | Stringham | |
| 5,232,086 A | 8/1993 | Montanari | |
| 5,392,622 A | 2/1995 | O'Donnell | |
| 5,423,209 A | 6/1995 | Nakaya et al. | |
| 5,458,008 A | 10/1995 | Rassatt | |
| 5,460,022 A | 10/1995 | Parsons | |
| 5,466,067 A | 11/1995 | Hagen et al. | |
| 5,487,291 A | 1/1996 | Voigt | |
| 5,495,942 A | 3/1996 | Izhak | |
| 5,543,183 A | 8/1996 | Streckert et al. | |
| 5,621,936 A | 4/1997 | Penaligon et al. | |
| 5,639,964 A | 6/1997 | Djorup | |
| 5,653,538 A | 8/1997 | Phillips | |
| 5,731,507 A | 3/1998 | Hagen | |
| 5,740,857 A | 4/1998 | Thompson et al. | |
| 6,062,869 A | 5/2000 | Mizobuchi et al. | |
| 6,070,475 A | 6/2000 | Muehlhauser et al. | |
| 6,079,845 A | 6/2000 | Kreider | |
| 6,237,756 B1 | 5/2001 | Caudle | |
| 6,323,420 B1 * | 11/2001 | Head | F16L 7/00 174/47 |
| 6,371,286 B1 | 4/2002 | Montanari | |
| 6,419,186 B1 | 7/2002 | Bachinski et al. | |
| D463,989 S | 10/2002 | Bachinski et al. | |
| 6,550,344 B2 | 4/2003 | Bachinski et al. | |
| 6,591,696 B2 * | 7/2003 | Bachinski | G01P 5/165 73/747 |
| 6,612,166 B2 | 9/2003 | Golly et al. | |
| 6,648,939 B2 | 11/2003 | Neuschwander et al. | |
| 6,740,857 B1 * | 5/2004 | Furlong | H05B 3/46 219/541 |
| 6,813,942 B1 | 11/2004 | Vozhdaev et al. | |
| 6,840,672 B2 | 1/2005 | Ice et al. | |
| 6,892,584 B2 * | 5/2005 | Gilkison | G01P 5/165 73/1.29 |
| 6,941,805 B2 | 9/2005 | Seidel et al. | |
| 7,370,526 B1 | 5/2008 | Ice | |
| 7,483,223 B2 | 1/2009 | Egle et al. | |
| 7,549,331 B1 | 6/2009 | Powell | |
| 7,597,018 B2 | 10/2009 | Braun et al. | |
| 7,705,275 B2 | 4/2010 | Umotoy et al. | |
| 7,716,980 B1 | 5/2010 | Colten et al. | |
| 7,915,567 B2 | 3/2011 | Lhuillier | |
| 7,937,977 B2 | 5/2011 | Booker | |
| 8,060,334 B1 | 11/2011 | Jarvinen | |
| 8,225,696 B2 | 7/2012 | Downes | |
| 8,341,989 B1 | 1/2013 | Hamblin et al. | |
| 8,365,591 B2 | 2/2013 | Golly | |
| 3,485,007 A1 | 7/2013 | Downes | |
| 3,718,955 A1 | 5/2014 | Golly et al. | |
| 8,857,255 B2 | 10/2014 | Anderson et al. | |
| 9,080,903 B2 | 7/2015 | Ashton | |
| 9,207,253 B2 | 12/2015 | Seidel et al. | |
| 9,279,684 B2 | 3/2016 | Marty et al. | |
| 9,366,555 B2 | 6/2016 | Schober et al. | |
| 9,541,429 B2 | 1/2017 | Farokhi et al. | |
| 9,664,542 B2 * | 5/2017 | Gordon | B33Y 80/00 |
| 9,722,345 B2 | 8/2017 | Amesson et al. | |
| 9,772,345 B2 | 9/2017 | Golly et al. | |
| 9,791,304 B2 | 10/2017 | Wong et al. | |
| 9,856,027 B2 | 1/2018 | Anderson et al. | |
| 9,891,083 B2 | 2/2018 | Gordon et al. | |
| 9,918,524 B2 | 3/2018 | Byrd et al. | |
| 9,976,882 B2 | 5/2018 | Seidel et al. | |
| 10,024,877 B2 | 7/2018 | Golly et al. | |
| 10,040,570 B2 | 8/2018 | Heuer et al. | |
| 10,227,139 B2 | 3/2019 | Golly et al. | |
| 10,281,303 B2 | 5/2019 | Johnson et al. | |
| 10,384,787 B2 | 8/2019 | Gordon et al. | |
| 10,613,112 B2 | 4/2020 | Golly et al. | |
| 2004/0085211 A1 | 5/2004 | Gotfried | |
| 2004/0093953 A1 | 5/2004 | Gilkison et al. | |
| 2004/0177683 A1 | 9/2004 | Ice | |
| 2004/0244477 A1 | 12/2004 | Zippold et al. | |
| 2005/0011285 A1 | 1/2005 | Giterman | |
| 2005/0179542 A1 | 8/2005 | Young | |
| 2006/0144007 A1 * | 7/2006 | Azarin | E04B 1/4121 52/698 |
| 2006/0207753 A1 | 9/2006 | Sanatgar et al. | |
| 2007/0079639 A1 | 4/2007 | Hsu | |
| 2010/0000885 A1 | 1/2010 | Downes | |
| 2010/0123549 A1 | 5/2010 | Lickfelt et al. | |
| 2011/0036160 A1 | 2/2011 | Pineau et al. | |
| 2012/0280498 A1 * | 11/2012 | Irwin | F16L 13/146 285/382.7 |
| 2013/0014586 A1 | 1/2013 | Walling et al. | |
| 2013/0145862 A1 | 6/2013 | Leblond et al. | |
| 2014/0053644 A1 | 2/2014 | Anderson et al. | |
| 2014/0156226 A1 | 6/2014 | Hashemian et al. | |
| 2014/0332192 A1 | 11/2014 | Cosby, II et al. | |
| 2015/0356393 A1 | 12/2015 | Daoura et al. | |
| 2016/0091355 A1 | 3/2016 | Mesnard et al. | |
| 2016/0280391 A1 | 9/2016 | Golly et al. | |
| 2017/0052046 A1 * | 2/2017 | Gordon | G01P 5/165 |
| 2017/0086656 A1 * | 3/2017 | Hiratsuka | F16G 11/025 |
| 2017/0092030 A1 | 3/2017 | Badger, II | |
| 2017/0108360 A1 | 4/2017 | Wong et al. | |
| 2017/0110838 A1 * | 4/2017 | Sasaki | H01R 9/0518 |
| 2017/0115139 A1 | 4/2017 | Wong et al. | |
| 2017/0169974 A1 * | 6/2017 | Miyakawa | H01H 35/34 |
| 2017/0199063 A1 | 7/2017 | Gordon et al. | |
| 2017/0256340 A1 | 9/2017 | dos Santos e Lucato et al. | |
| 2017/0369175 A1 | 12/2017 | Gordon et al. | |
| 2018/0128849 A1 | 5/2018 | Wong et al. | |
| 2018/0175518 A1 * | 6/2018 | Mori | H01R 24/38 |
| 2018/0209863 A1 | 7/2018 | Golly | |
| 2018/0259547 A1 | 9/2018 | Abdullah et al. | |
| 2018/0259548 A1 | 9/2018 | Anderson et al. | |
| 2020/0114428 A1 | 4/2020 | Golly et al. | |

FOREIGN PATENT DOCUMENTS

| | | |
|---|---|---|
| EP | 0737315 A1 | 10/1996 |
| EP | 3073275 A2 | 9/2016 |
| EP | 3076185 A1 | 10/2016 |
| EP | 3133403 A1 | 2/2017 |
| EP | 3214704 A1 | 9/2017 |
| EP | 3499217 A2 | 6/2019 |
| GB | 562880 | 7/1944 |
| GB | 1118794 | 7/1968 |
| WO | WO9613727 A1 | 5/1996 |
| WO | WO9816837 A1 | 4/1998 |
| WO | WO0111582 A1 | 2/2001 |
| WO | WO0167115 A2 | 9/2001 |
| WO | WO0177622 A2 | 10/2001 |

OTHER PUBLICATIONS

Extended European Search Report for European Patent Application No. 18207317.1, dated May 24, 2019, 7 pages.

Extended European Search Report for European Patent Application No. 19207424.3, dated Mar. 13, 2020, 8 pages.

Extended European Search Report for European Patent Application No. 19215840.0, dated Jul. 3, 2020, 14 pages.

Extended European Search Report for European Patent Application No. 19213580.4, dated Jun. 26, 2020, 13 pages.

* cited by examiner

PITOT PROBE WITH MANDREL AND PRESSURE SWAGED OUTER SHELL

BACKGROUND

The present disclosure relates generally to air data probes, and in particular, to pitot probes.

Pitot probes are installed on aircraft to measure air data parameters. Pitot probes are exposed to the environmental conditions exterior to the aircraft, which are often cold. As such, heaters are positioned within pitot probes to ensure the pitot probes function properly. The heater is generally connected to the probe head of the pitot probe. It can be difficult to successfully connect the heater to the probe head.

SUMMARY

A probe head of a pitot probe includes a mandrel having a helical groove, a heater within the helical groove of the mandrel such that an exterior surface of the heater is flush with an exterior surface of the mandrel, and an outer shell having an interior surface in air-tight contact with the mandrel and the heater.

A method for forming a pitot probe includes inserting a mandrel with a heater into an outer shell of a probe head and pressure swaging the outer shell onto the mandrel and the heater such that an interior surface of the outer shell is sealed against the exterior surface of the mandrel and the exterior surface of the heater.

A pitot probe includes a strut, a mounting flange connected to the strut, and a probe head connected to the strut. The probe head includes a mandrel having a groove, a heater within the groove of the mandrel such that an exterior surface of the heater is flush with an exterior surface of the mandrel, and an outer shell having an interior surface sealed against the mandrel and the heater.

DETAILED DESCRIPTION

In general, the present disclosure describes a probe head of a pitot probe that is formed by pressure swaging an outer shell of the probe head onto a mandrel with a heater wound around a groove in the mandrel. As a result, the braze requirement is eliminated, preventing the potential for sections of unbrazed heater, which cause premature heater failure. Additionally, the method for forming the probe head can be carried out in a lower temperature environment and is simple, quick, and cost-effective.

Figure 1:
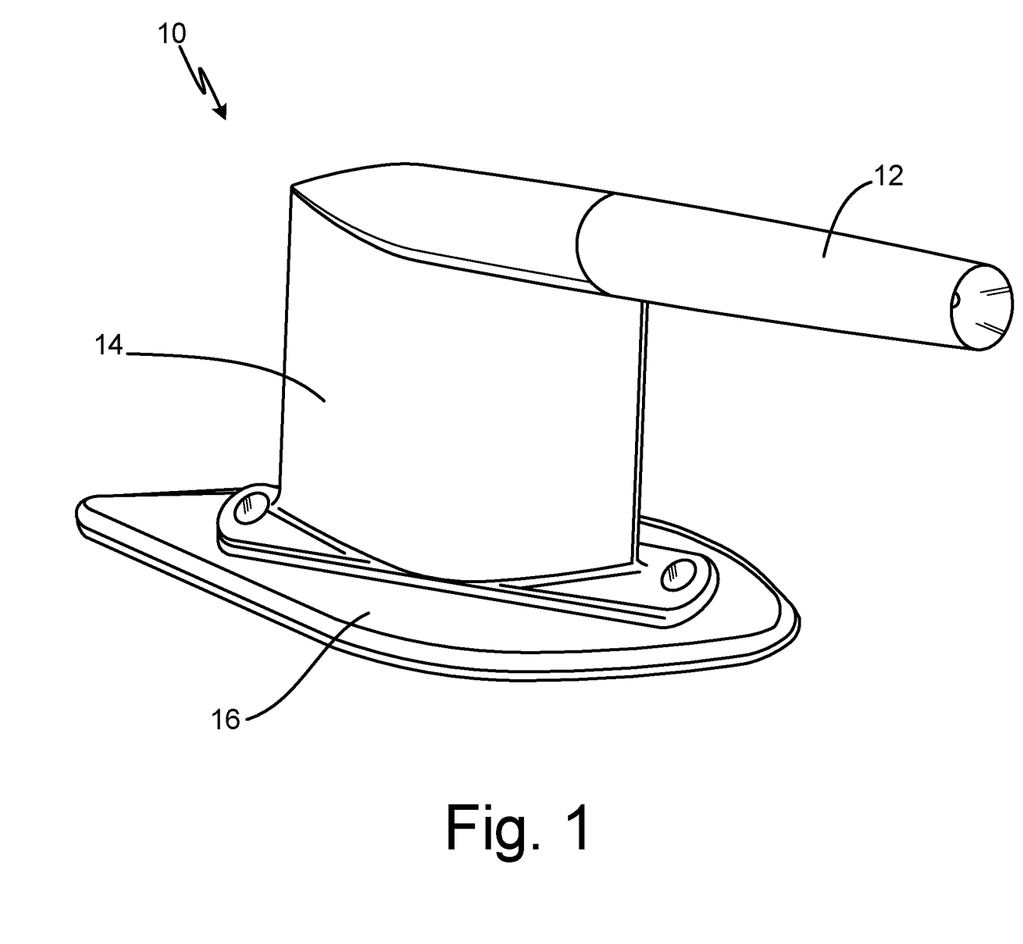
FIG. 1 is a perspective view of a pitot probe.

FIG. 1 is a perspective view of pitot probe 10. Pitot probe 10 includes probe head 12, strut 14, and mounting flange 16.

Probe head 12 is connected to a first end of strut 14. Probe head 12 is the sensing head of pitot probe 10. Probe head 12 has one or more ports positioned in probe head 12. Internal components of pitot probe 10 are located within probe head 12. A second end of strut 14 is connected to mounting flange 16. As such, strut 14 connects probe head 12 to mounting flange 16. Strut 14 is blade-shaped. Internal components of pitot probe 10 are located within strut 14. Mounting flange 16 makes up a mount of pitot probe 10. Mounting flange 16 is connectable to an aircraft.

Pitot probe 10 is installed on an aircraft. Pitot probe 10 may be mounted to a fuselage of the aircraft via mounting flange 16 and fasteners, such as screws or bolts. Strut 14 holds probe head 12 away from the fuselage of the aircraft to expose probe head 12 to external airflow. Probe head 12 takes in air from surrounding external airflow via the one or more ports positioned in probe head 12. Air pressures from probe head 12 are communicated pneumatically through internal components and passages of probe head 12 and strut 14. Pressure measurements are communicated to a flight computer and can be used to generate air data parameters related to the aircraft flight condition.

Figure 2:
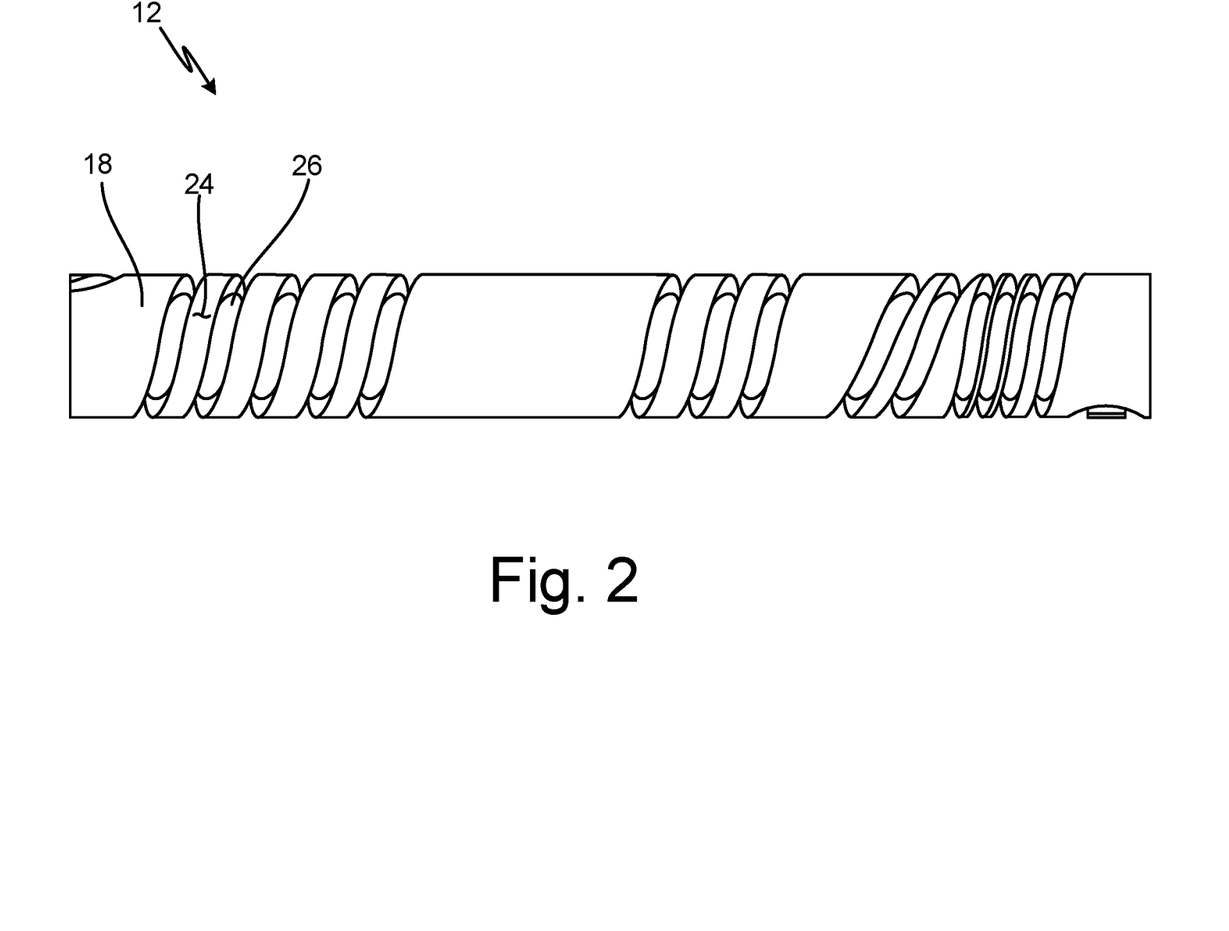
FIG. 2 is a perspective view of a mandrel of the pitot probe.
Figure 3:
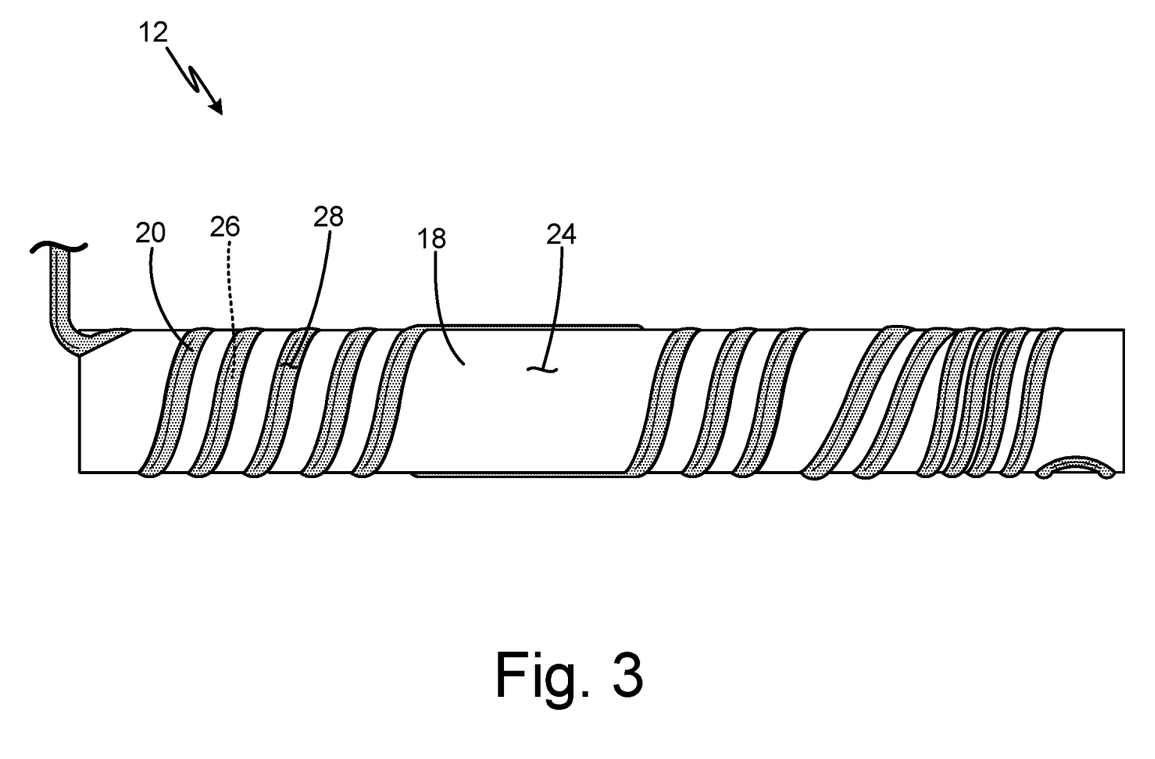
FIG. 3 is a partial perspective view of a heater wrapped around the mandrel of the pitot probe.
Figure 4A:
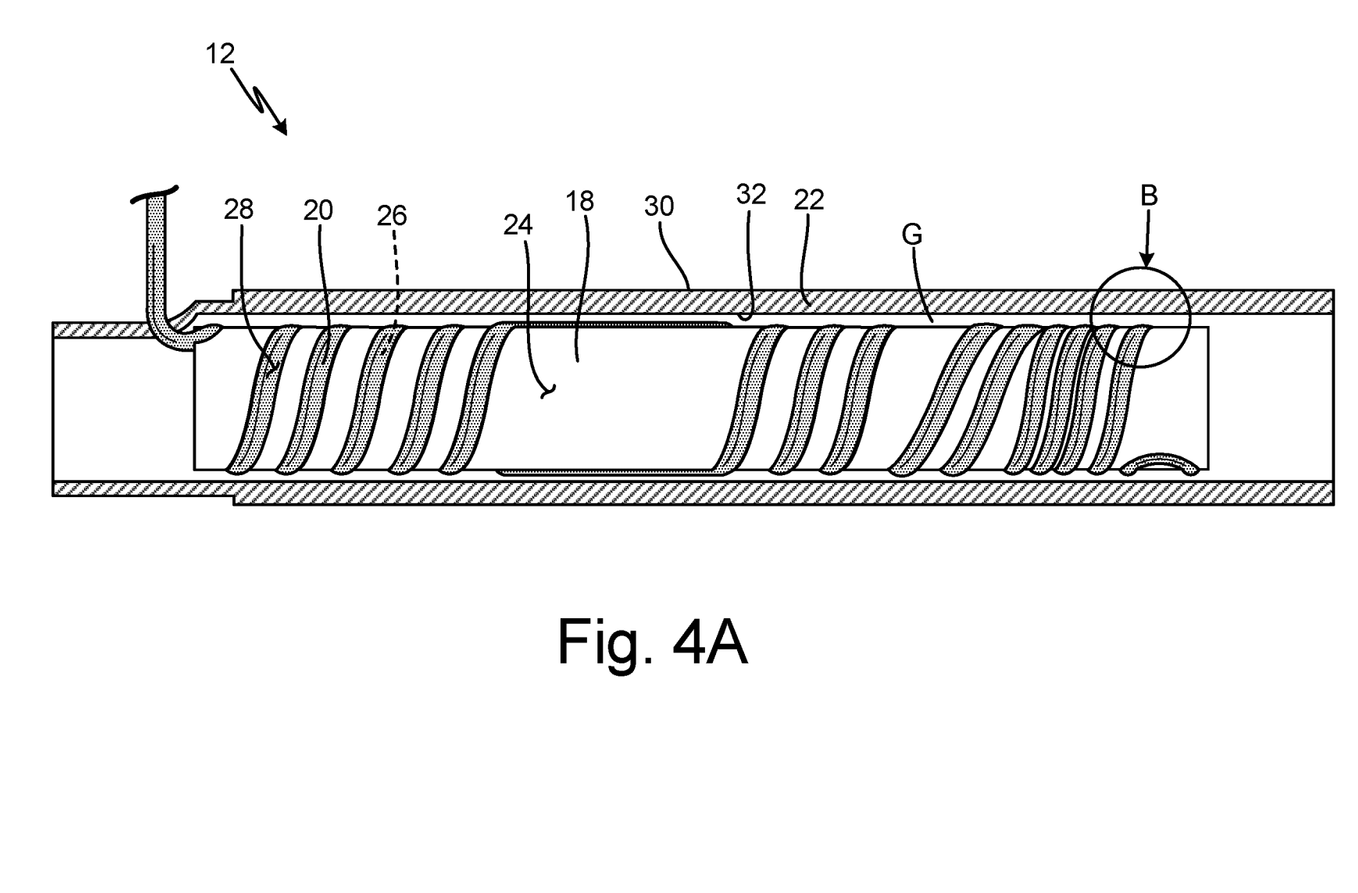
FIG. 4A is a partial cross-sectional view of the mandrel and the heater inside an outer shell of the pitot probe.
Figure 4B:
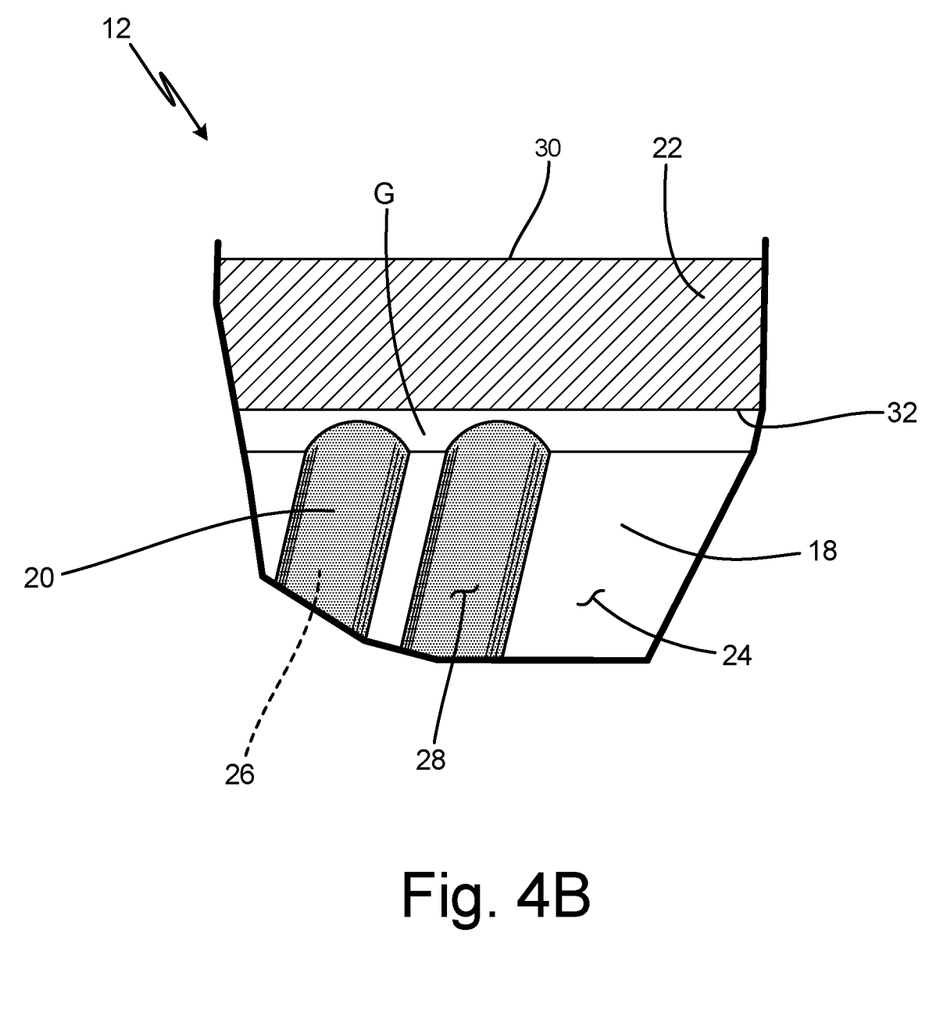
FIG. 4B is a partial enlarged cross-sectional view of section B of the pitot probe of FIG. 4A.
Figure 4C:
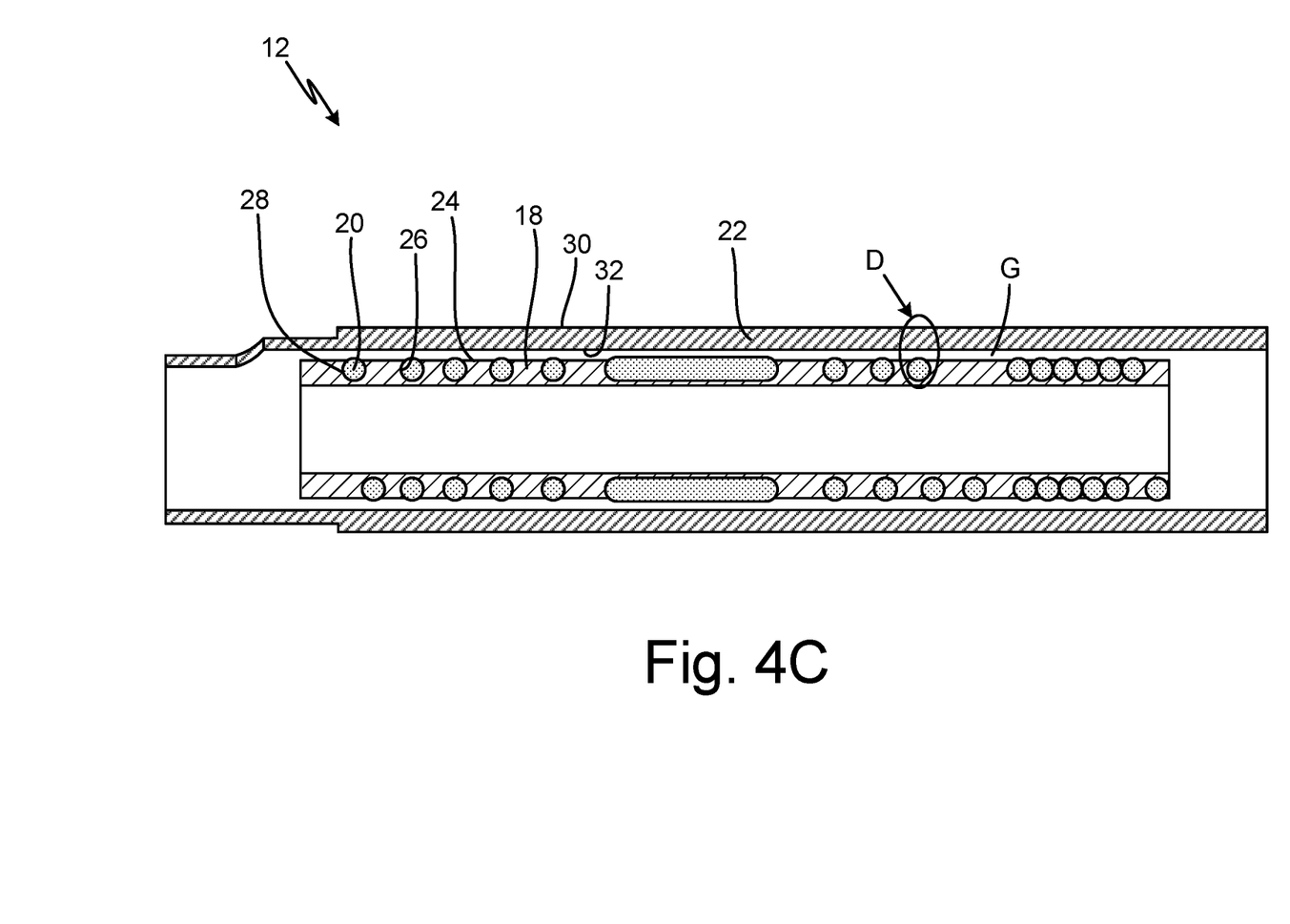
FIG. 4C is a partial cross-sectional view of the mandrel and the heater inside an outer shell of the pitot probe.
Figure 4D:
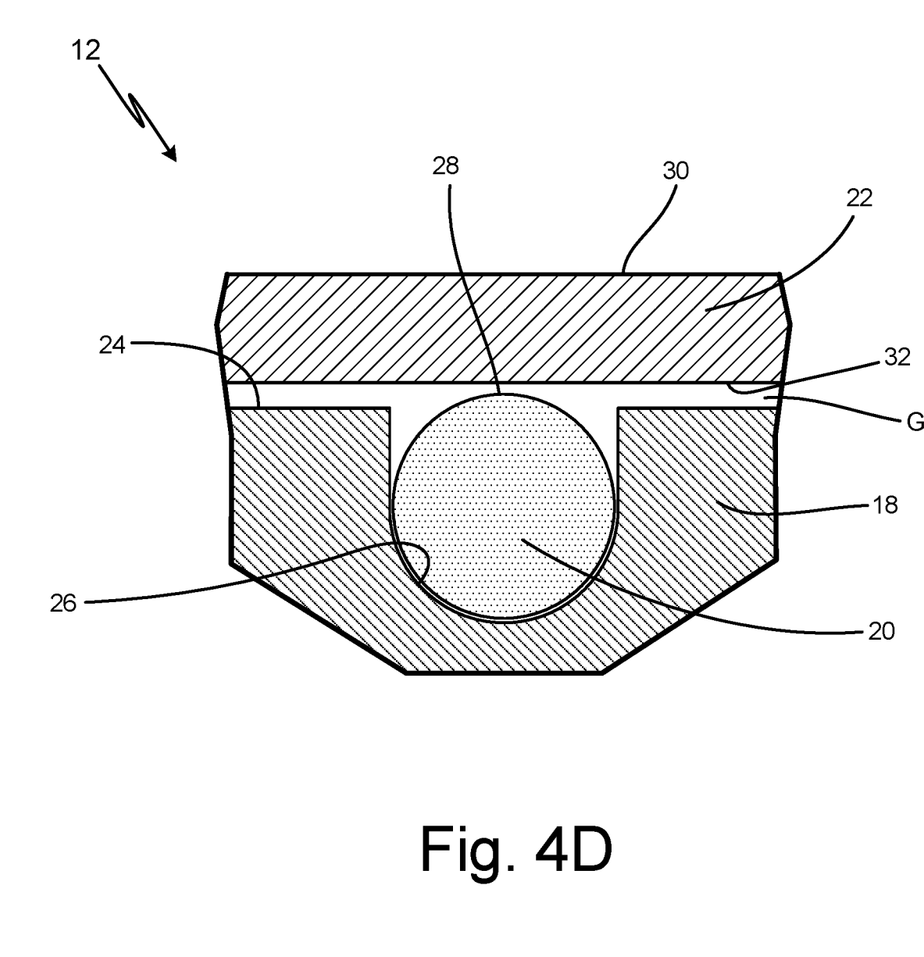
FIG. 4D is a partial enlarged cross-sectional view of section D of the pitot probe of FIG. 4C.
Figure 5A:
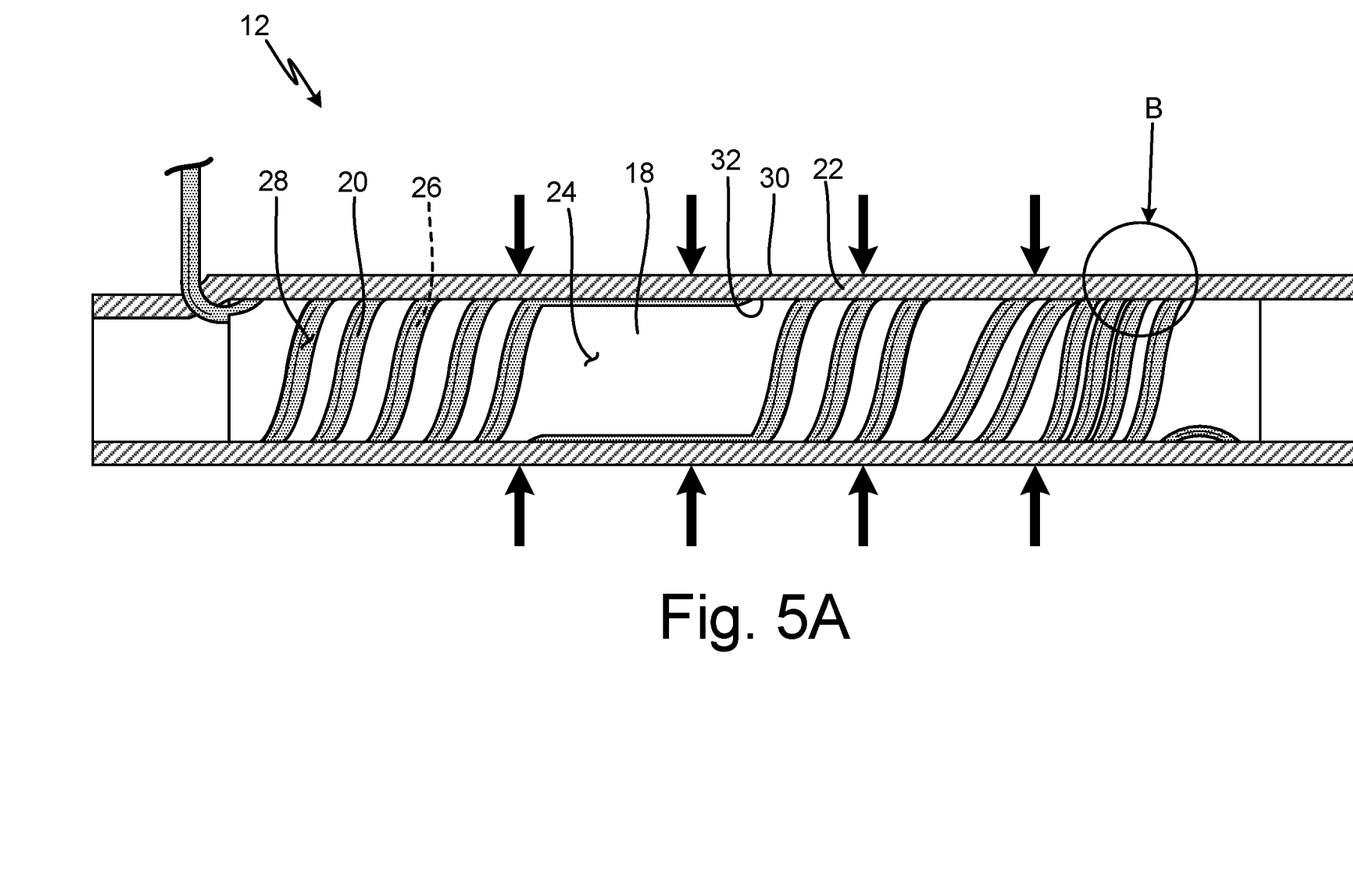
FIG. 5A is a partial cross-sectional view of the mandrel and the heater pressure swaged to the outer shell of the pitot probe.
Figure 5B:
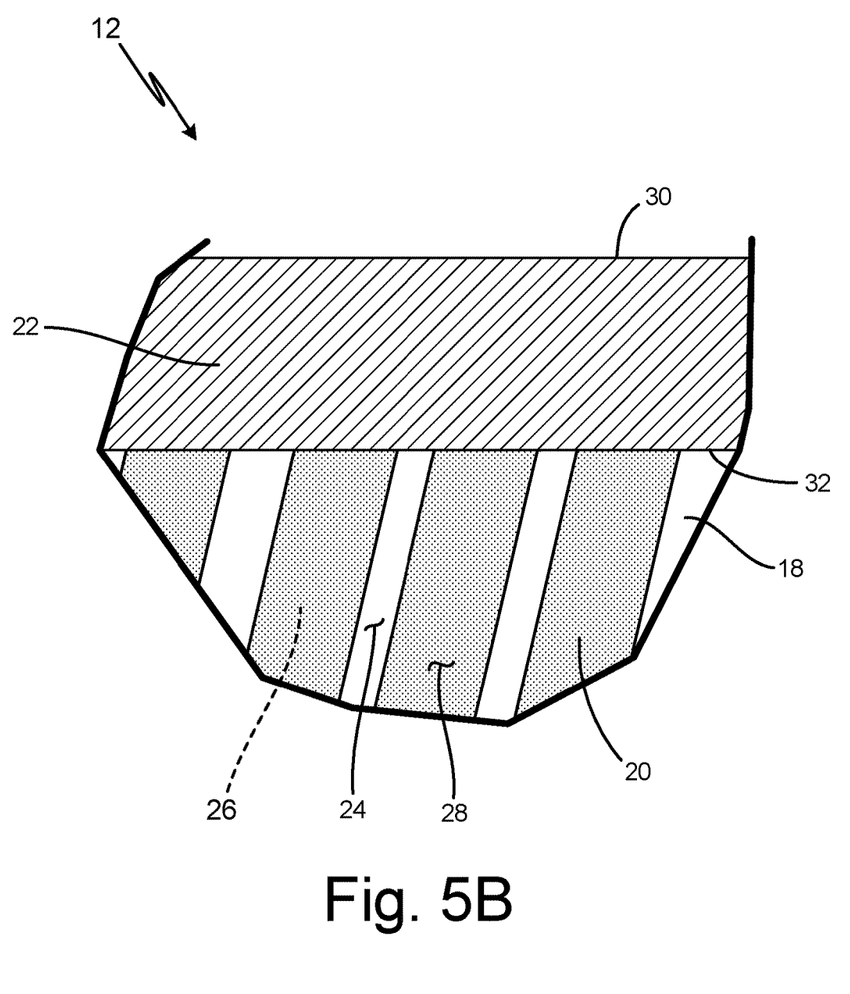
FIG. 5B is a partial enlarged view of section B of the pitot probe of FIG. 5A.
Figure 5C:
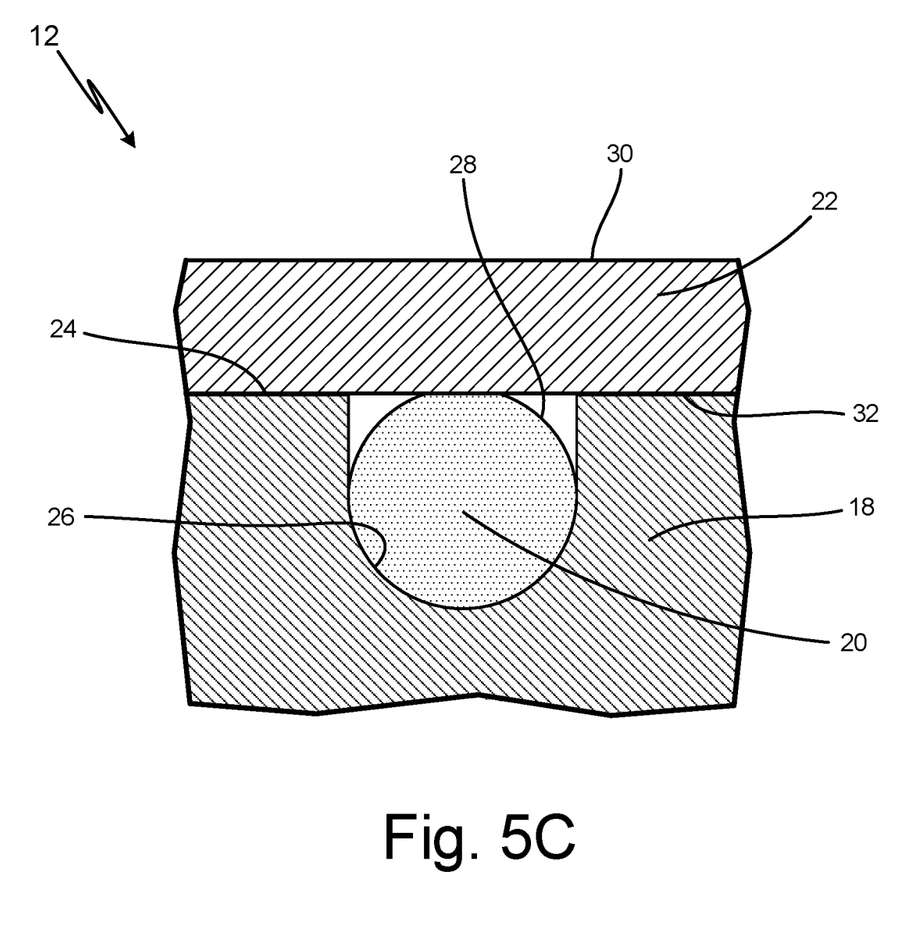
FIG. 5C is a partial cross-sectional view of the pitot probe of FIG. 5A.

FIGS. 2-5C illustrate the method for forming pitot probe 10. FIG. 2 is a perspective view of mandrel 18 of pitot probe 10. FIG. 3 is a partial perspective view of heater 20 wrapped around mandrel 18 of pitot probe 10. FIG. 4A is a partial cross-sectional view of mandrel 18 and heater 20 inside outer shell 22 of pitot probe 10. Mandrel 18 and heater 20 are not shown in cross-section in FIG. 4A. FIG. 4B is a partial enlarged cross-sectional view of section B of pitot probe 10 of FIG. 4A. Mandrel 18 and heater 20 are not shown in cross-section in FIG. 4B. FIG. 4C is a partial cross-sectional view of mandrel 18 and heater 20 inside outer shell 22 of pitot probe 10. FIG. 4D is a partial enlarged cross-sectional view of section D of the pitot probe of FIG. 4C. FIG. 5A is a partial cross-sectional view of mandrel 18 and heater 22 pressure swaged to outer shell 22 of pitot probe 10. Mandrel 18 and heater 20 are not shown in cross-section in FIG. 5A. FIG. 5B is a partial enlarged view of section B of pitot probe 10 of FIG. 5A. Mandrel 18 and heater 20 are not shown in cross-section in FIG. 5B. FIG. 5C is a partial cross-sectional view of pitot probe 10 of FIG. 5A.

FIGS. 2-5C will be discussed together to describe the components of pitot probe 10. Pitot probe 10 includes probe head 12. Probe head 12 includes mandrel 18, heater 20 (shown in FIGS. 3-5C), and outer shell 22 (shown in FIGS. 4A-5C). Mandrel 18 includes exterior surface 24 and groove 26. Heater 20 includes exterior surface 28. Outer shell 22 includes exterior surface 30 and interior surface 32.

Probe head 12 is hollow and substantially cylindrical. Mandrel 18 is also hollow and substantially cylindrical and defines a cavity of probe head 12. Heater 20 is wire-like and is helically wound around mandrel 18. Outer shell 22 is substantially cylindrical and surrounds mandrel 18 and heater 20 such that heater 20 is directly between mandrel 18 and outer shell 22. Outer shell 22 is connected to mandrel 18 and heater 20. The connection between outer shell 22 and mandrel 18 with helically wound heater 20 is air-tight.

Mandrel 18 has exterior surface 24, which is an outer surface of mandrel 18.

Groove 26 extends into mandrel 18 from exterior surface 24. Groove 26 is helical and winds along mandrel 18. Heater 20 is positioned within groove 26 of mandrel 18. As a result, heater 20 is helical. Heater 20 has exterior surface 28, which is an outer surface of heater 20. Exterior surface 28 of heater 20 contacts groove 26 of mandrel 18 and outer shell 22. A portion of exterior surface 28 of heater 20, or exterior surface 28 at a periphery of helically wound heater 20, is flush with exterior surface 24 of mandrel 18, as shown in FIGS. 5A-5C. As a result, the exterior surfaces 24 and 28 of mandrel 18 and heater 20 are smooth with respect to each other. Outer shell 22 has exterior surface 30, which is an outer surface of outer shell 22, and interior surface 32, which is an inner surface of outer shell 22. Exterior surface 30 of outer shell 22 is an exterior surface of probe head 12. Interior surface 32 of outer shell 22 contacts exterior surface 24 of mandrel 18 and a periphery of exterior surface 28 of helically-wound heater 20. Interior surface 32 of outer shell 22 makes complete, or air-tight, contact with exterior surface 24 of mandrel 18 and exterior surface 28 of heater 20. Interior surface 32 of outer shell 22 is sealed against mandrel 18 and heater 20.

FIG. 2 shows mandrel 18 with groove 26. Groove 26 is machined into mandrel 18. Groove 26 is machined to have a defined depth and width for accepting heater 20.

FIG. 3 shows heater 20 wrapped around mandrel 18. Heater 20 is helically wound into groove 26 in mandrel 18. Heater 20 has a slip fit with groove 26 and fills the entire length of groove 26. Groove 26 has a defined depth such that a portion of exterior surface 28 of heater 26 is proud of exterior surface 24 of mandrel 18, or a periphery of exterior surface 28 of heater 26 is radially outward from exterior surface 24 of mandrel 18, when heater 26 is within groove 26.

FIG. 4A shows mandrel 18 and heater 20 inside outer shell 22. Mandrel 18 with helically wound heater 20 is inserted into outer shell 22. Outer shell 22 is hollow to accept mandrel 18 and heater 20 such that gap G is formed between interior surface 32 of outer shell 22 and exterior surfaces 24 and 28 of mandrel 18 with heater 20. As seen in FIGS. 4A-4D, when gap G is present, mandrel 18 and heater 20 do not contact outer shell 22.

FIG. 5A shows mandrel 18 with heater 22 pressure swaged to outer shell 22. The large arrows in FIG. 5A indicate that outer shell 22 has been pressure swaged onto mandrel 18 and heater 20. Outer shell 22 is pressure swaged onto mandrel 18 with proud heater 22 such that outer shell 22 is radially compressed. During pressure swaging, outer shell 22 is radially compressed by mechanical force (radial hammering) directed at and coaxially rotating around outer shell 22. As a result, heater 22 is compressed, or deformed. As seen in FIGS. 5B and 5C, helically wound heater 20 is deformed during the pressure swaging process such that a periphery of exterior surface 28 of heater 20 flattens and becomes flush with exterior surface 24 of mandrel 18. Mandrel 18 does not compress during pressure swaging. Heater 20 changes shape to conform to groove 26 of mandrel 18 and interior surface 32 of outer shell 22.

Interior surface 32 of outer shell 22 makes complete contact with, or is sealed against, exterior surface 24 of mandrel 18 and a periphery of exterior surface 28 of heater 20. As seen in FIGS. 5A-5C, pressure swaging outer shell 22 onto mandrel 18 and heater 20 eliminates gap G. A tight interference fit is created between outer shell 22 and mandrel 18 with heater 20. Pressure swaging may be carried out with or without the addition of heat, depending on the materials of probe head 12. Heater 20 is secured inside probe head 12. Exterior surface 30 of outer shell 22 of probe head 12 may be machined to finish, or smooth out, exterior surface 30.

Mandrel 18 is hollow to allow air through probe head 12. Mandrel 18 secures and supports heater 20 during the pressure swaging process. Groove 26 provides a track for heater 20 and prevents heater 20 from over compressing during pressure swaging. As a result, heater 20 becomes helical as heater 20 is wound into groove 26 around mandrel 18. Groove 26 is also shaped so that heater 20 initially protrudes above exterior surface 24 of mandrel 18, which ensures heater 20 will make sufficient contact with interior surface 32 of outer shell 22 during pressure swaging. Outer shell 22 is sized to create gap G, allowing for appropriate clearance during insertion of mandrel 18 with helically wound heater 20. During pressure swaging, the diameter of outer shell 22 is reduced and heater 20 is deformed to become flush with exterior surface 28 of mandrel 18, ensuring that outer shell 22 makes sufficient contact with mandrel 18 and heater 20. As a result, an air tight seal is created between outer shell 22, mandrel 18, and heater 20. Heater 20 will make contact with mandrel 18 and outer shell 22 due to pressure swaging.

Heater 20 transmits heat to prevent ice from accumulating on an exterior of pitot probe 10. Sufficient contact of heater 20 with mandrel 18 and outer shell 22 is necessary in order for heater 20 to transfer heat. Heater 20 transferring heat to mandrel 18 and outer shell 22 prevents heater 20 from overheating and burning out. For example, if heater 20 were not touching mandrel 18 and outer shell 22, heater 20 would overheat and fail, causing pitot probe 10 to fail.

Typically, probe heads of pitot probes are formed by brazing the heater to the outer shell. Pressure swaging outer shell 22 onto mandrel 18 with helically wound heater 20 is reliable and eliminates the need for brazing. As a result, the potential for sections of unbrazed heater, which cause premature heater failure, is prevented.

Additionally, pressure swaging is done mechanically, which enables heater 20 to be joined to outer shell 22 in a lower temperature environment. Thus, heater 20 can be made of materials having a lower melting point, less stress is placed on heater 20, and the process for forming probe head 12 is simplified. Pressure swaging outer shell 22 to mandrel 18 and heater 20 is also quick, with shorter cycle times, and requires less processing. As a result, pressure swaging outer shell 22 onto mandrel 18 and heater 22 is easier to automate and more cost-effective.

DISCUSSION OF POSSIBLE EMBODIMENTS

The following are non-exclusive descriptions of possible embodiments of the present invention.

A probe head of a pitot probe includes a mandrel having a helical groove; a heater within the helical groove of the mandrel such that an exterior surface of the heater is flush with an exterior surface of the mandrel; and an outer shell having an interior surface in air-tight contact with the mandrel and the heater.

The probe head of the preceding paragraph can optionally include, additionally and/or alternatively, any one or more of the following features, configurations and/or additional components:

The heater is directly between the mandrel and the outer shell.

The heater is helical and the groove in the mandrel is helical.

The outer shell has been pressure swaged to the mandrel and the heater.

The exterior surface of the heater contacts the outer shell and the groove of the mandrel A method for forming a pitot probe includes inserting a mandrel with a heater into an outer shell of a probe head; and pressure swaging the outer shell onto the mandrel and the heater such that an interior surface of the outer shell is sealed against an exterior surface of the mandrel and an exterior surface of the heater.

The method of the preceding paragraph can optionally include, additionally and/or alternatively, any one or more of the following features, configurations and/or additional components:

Machining a groove into the mandrel.

The groove is helical.

Helically winding the heater into a helical groove in the mandrel.

The heater is helically wound into a groove in the mandrel such that a portion of the exterior surface of the heater is proud of the exterior surface of the mandrel.

Inserting the mandrel with the heater into the outer shell forms a gap between the interior surface of the outer shell and the exterior surfaces of the mandrel and the heater, and pressure swaging the outer shell onto the mandrel with the heater eliminates the gap.

Pressure swaging the outer shell onto the mandrel with the heater compresses the heater such that the exterior surface of the heater is about flush with the exterior surface of the mandrel.

A pitot probe includes a strut; a mounting flange connected to the strut; and a probe head connected to the strut, the probe head including: a mandrel having a groove; a heater within the groove of the mandrel such that an exterior surface of the heater is flush with an exterior surface of the mandrel; and an outer shell having an interior surface sealed against the mandrel and the heater.

The pitot probe of the preceding paragraph can optionally include, additionally and/or alternatively, any one or more of the following features, configurations and/or additional components:

The heater is directly between the mandrel and the outer shell.

The heater is helical and the groove in the mandrel is helical.

The outer shell has been pressure swaged to the mandrel and the heater.

The exterior surface of the heater contacts the outer shell and the groove of the mandrel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A probe head of a pitot probe comprising:
a tubular mandrel having a helical groove;
a heater within the helical groove of the mandrel; and
a swaged outer shell joined to the mandrel and the heater so that an interior surface of the outer shell is in air-tight contact with the mandrel and the heater, and the heater is deformed as a result of pressure swaging of the outer shell such that an exterior surface of the heater is flush with an exterior surface of the mandrel.

2. The probe head of claim 1, wherein the heater is directly between the mandrel and the outer shell.

3. The probe head of claim 1, wherein the heater is helical.

4. The probe head of claim 1, wherein the exterior surface of the heater contacts the outer shell and the groove of the mandrel.

5. A method for forming a pitot probe comprising:
inserting a mandrel with a heater into an outer shell of a probe head; and
pressure swaging the outer shell onto the mandrel and the heater such that the heater is deformed;
wherein pressure swaging the outer shell onto the mandrel with the heater joins the outer shell to the mandrel and the heater so that an interior surface of the outer shell is sealed against an exterior surface of the mandrel and an exterior surface of the heater and compresses the heater such that the heater is deformed so that the exterior surface of the heater is about flush with the exterior surface of the mandrel.

6. The method of claim 5, further including machining a groove into the mandrel.

7. The method of claim 6, wherein the groove is helical.

8. The method of claim 5, further including helically winding the heater into a helical groove in the mandrel.

9. The method of claim 5, wherein the heater is helically wound into a groove in the mandrel such that a portion of the exterior surface of the heater is radially outward from the exterior surface of the mandrel.

10. The method of claim 5, wherein inserting the mandrel with the heater into the outer shell forms a gap between the interior surface of the outer shell and the exterior surfaces of the mandrel and the heater, and pressure swaging the outer shell onto the mandrel with the heater eliminates the gap.

11. A pitot probe comprising:
a strut;
a mounting flange connected to the strut; and
a probe head connected to the strut, the probe head including:
a tubular mandrel having a groove;
a heater within the groove of the mandrel; and
a swaged outer shell joined to the mandrel and the heater so that an interior surface of the outer shell sealed against the mandrel and the heater, and the heater is deformed as a result of pressure swaging of the outer shell such that an exterior surface of the heater is flush with an exterior surface of the mandrel.

12. The pitot probe of claim 11, wherein the heater is directly between the mandrel and the outer shell.

13. The probe head of claim 11, wherein the heater is helical and the groove in the mandrel is helical.

14. The probe head of claim 11, wherein the exterior surface of the heater contacts the outer shell and the groove of the mandrel.

* * * * *